United States Patent [19]

Tanaka et al.

[11] Patent Number: 5,146,899
[45] Date of Patent: Sep. 15, 1992

[54] FUEL CONTROL SYSTEM FOR INJECTED ENGINE

[75] Inventors: Takeshi Tanaka; Kunio Kajiwara, both of Iwata, Japan

[73] Assignee: Yamaha Hatsudoki Kabushiki Kaisha, Iwata, Japan

[21] Appl. No.: 765,134

[22] Filed: Sep. 25, 1991

[30] Foreign Application Priority Data

Sep. 25, 1990 [JP] Japan .................. 2-256452

[51] Int. Cl.⁵ .............. F02D 41/04; F02M 33/04
[52] U.S. Cl. ........................... 123/494; 123/478; 123/479; 123/73 C
[58] Field of Search .............. 123/73 A, 73 C, 478, 123/480, 479, 492, 493, 494

[56] References Cited

U.S. PATENT DOCUMENTS

| | | | |
|---|---|---|---|
| 4,770,146 | 9/1988 | Shibata et al. | 123/479 |
| 4,779,581 | 10/1988 | Maier | 123/73 A |
| 4,837,454 | 6/1989 | Ishii et al. | 123/479 X |
| 4,887,575 | 12/1989 | Takahashi | 123/489 X |
| 4,928,242 | 5/1990 | Suzuki | 123/479 X |
| 4,941,445 | 7/1990 | Deutsch | 123/479 X |
| 4,984,552 | 1/1991 | Nishizawa et al. | 123/492 |
| 5,048,491 | 9/1991 | Haiki | 123/479 |
| 5,092,287 | 3/1992 | Motoyama et al. | 123/492 X |

*Primary Examiner*—Willis R. Wolfe
*Attorney, Agent, or Firm*—Ernest A. Beutler

[57] ABSTRACT

A fuel injection control system for a two cycle crankcase compression internal combustion engine that employs two sensors for sensing engine load. One of the sensor, a throttle valve position sensor, is more sensitive at low speed and low load conditions and the other of the sensor, a crankcase pressure sensor, is more sensitive under high speed and high load conditions. The output of the fuel injectors is controlled by a map ratio showing the input signals from the two sensors in response to their areas of greatest selectivity.

59 Claims, 4 Drawing Sheets

FUEL CONTROL SYSTEM FOR INJECTED ENGINE

BACKGROUND OF THE INVENTION

This invention relates to a fuel control system for an engine and more particularly to an improved fuel control system for an injected engine.

The importance of providing a proper fuel/air mixture in the combustion chamber are well known. It is desirable to insure that the amount of fuel is only that necessary to achieve proper combustion and power output. Excess amounts of fuel can cause objectionable exhaust gas constituents and emission problems.

In order to provide more accurate control of fuel and better combustion, it has been proposed to employ direct cylinder injection. The amount of fuel injected is determined by the load and/or speed at which the engine is operating. Normally a sensor is employed for sensing either the load and/or speed condition of the engine and this sensor outputs a signal to a control which, in turn, controls the amount of fuel injected to suit the running condition. However, all sensors have certain ranges during which they have optimum sensitivity. When operated outside of their most sensitive range, the output of the sensor is not as indicative of the sensed condition as would be desirable. Since internal combustion engines, particularly those for automotive application, run over wide load and speed ranges, the use of a single sensor for the load condition is not completely satisfactory in providing the requisite fuel control.

It is, therefore, a principal object to this invention to provide an improved fuel control for an internal combustion engine.

It is a further object to this invention is provide a fuel control for an internal combustion engine that will be operative to provide the proper amount of fuel under widely varying running conditions.

SUMMARY OF THE INVENTION

This invention is adapted to be embodied in a fuel control system for an internal combustion engine operating over a range of speed and load conditions. A first sensor is provided for sensing a certain engine condition and providing an output signal indicative of that condition. A second sensor is provided for sensing a certain engine condition and provides an output signal indicative of that certain engine condition. The first sensor is more accurate in a certain portion of the engine range than the second sensor is in that range portion.

In accordance with a first feature of the invention, control means receive inputs from the first and second sensors and control the amount of fuel delivered to the engine and the control means is more responsive to the input from the first sensor when operating in the certain range portion.

Another feature of the invention is adapted to be embodied in a method for operating an engine as aforedescribed. In accordance with this method, the fuel supply is controlled primarily by the first sensor when operating in the certain range portion.

DETAILED DESCRIPTION OF THE PREFERRED EMBODIMENT OF THE INVENTION

Figure 1:
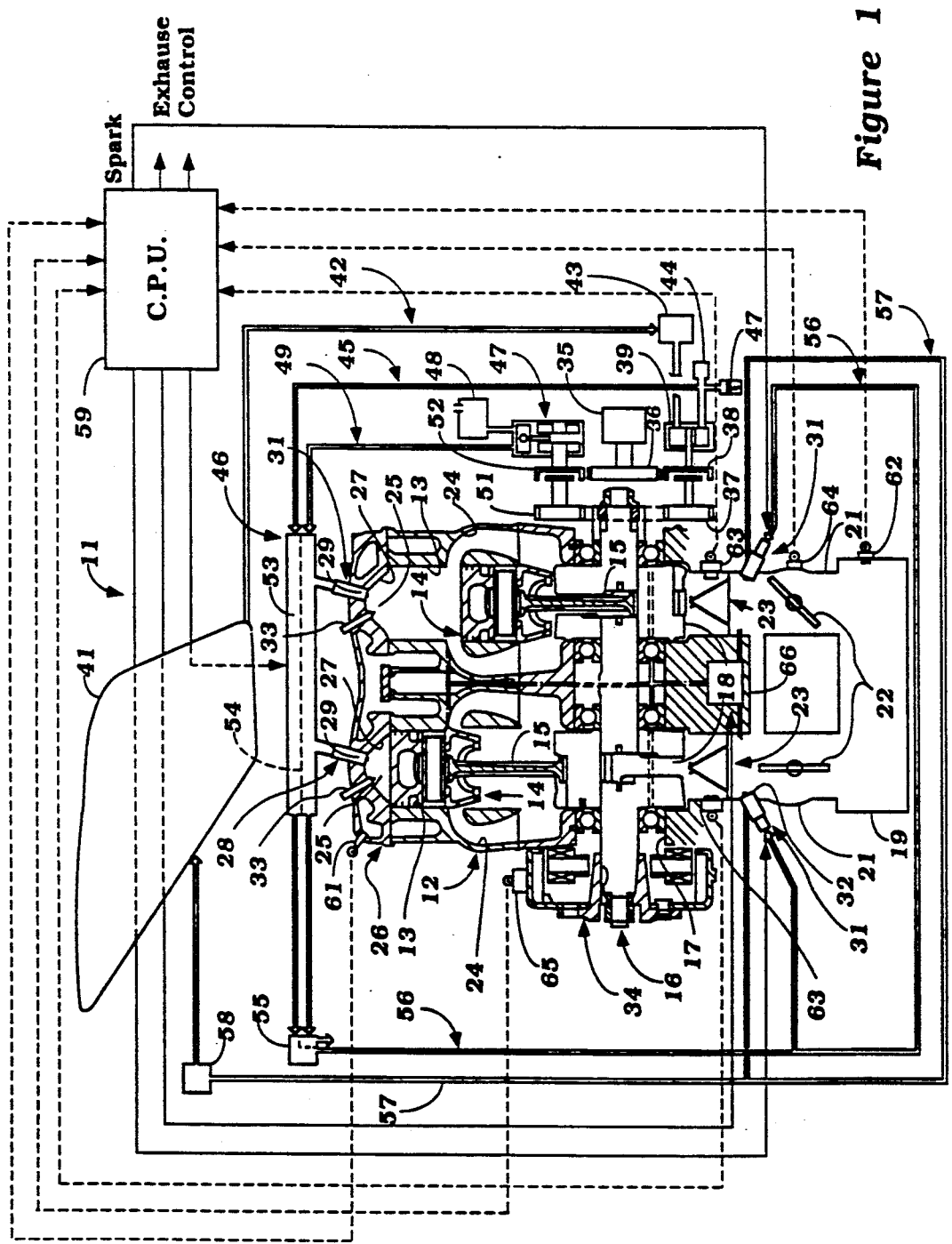
FIG. 1 is a cross sectional view taken through a portion of an internal combustion engine having a fuel injection system constructed and operated in accordance with an embodiment of the invention, with certain components shown schematicly.

Referring first in detail to FIG. 1, an internal combustion engine having a fuel injection system constructed and operated in accordance with an embodiment of the invention is identified generally by the reference numeral 11. In the illustrated embodiment, the engine 11 is employed for powering a motorcycle and is of two cylinder, two cycle crankcase compression type. It is to be understood that the invention has utility in other applications for internal combustion engines but is particularly useful in engines used to power motor vehicles because the system operates to provide good fuel control over widely varying engine speed and load ranges, as is required in vehicular applications. Also, although the invention is described in conjunction with a two cylinder reciprocating engine, is should be readily apparent that the principals of the invention can be employed with engines having other cylinder numbers, other cylinder configurations and, in fact, rotary type engines. Also, the invention has particularly utility with two cycle engines but can be applied to engines operated on other stroke cycles such as four cycle engines.

The engine 11 has a cylinder block 12 that is formed with cylinder bores 13 in which pistons 14 reciprocate. The pistons 14 are connected by means of connecting rods 15 to individual throws of a crankshaft 16. The crankshaft 16 is rotatably journalled within a crankcase made up of the lower portion of the cylinder block 12 and a crankcase member 17 that is affixed to the cylinder block 12 in a known manner. As is conventional with two cycle engine practice, individual crankcase chambers 18 are formed by the crankcase assembly and these crankcase chambers are sealed from each other in a suitable manner.

An air charge is delivered to these crankcase chambers 18 by an induction system that includes an air inlet device 19, which draws atmospheric air and supplies it to individual manifold runners 21 in which flow controlling throttle valves 22 are positioned. The throttle valves 22 are connected in a suitable manner to the throttle control for the engine which is not illustrated.

The manifold runners 21 terminate at reed type check valves 23 which permit the air charge to flow into the crankcase chambers 18 when the pistons 14 are moving upwardly in the cylinder bores 13 and which will close at the pistons 14 move downwardly to compress the air charge so as to prevent reverse flow through the induction system.

The charge which is admitted to the crankcase chambers 18 is then transferred during the next downward movement of the pistons 14 from the crankcase chamber to the cylinder bore 13 above the head of the pistons 14 through scavenge ports 24. This charge is then further compressed in a combustion chamber 25 formed between the heads of the pistons 14, the cylinder bore 13 and a cylinder head 26 that is affixed to the cylinder block 12 in a known manner. The combustion chamber 25 is formed in primary part by a recess 27 formed in the cylinder head 26.

A fuel/air charge is delivered to the combustion chamber 25 by means of a fuel/air injector 28, which may be of any known type and which injects both fuel and air into the combustion chamber 25 through an injection valve 29. The manner in which fuel and air is delivered to the injection valve 29 will be described latter. In addition, a fuel charge may be supplied to the induction system and specifically to the manifold runners 21 by means of fuel injectors 31 having discharge nozzles 32 that discharge into the upstream side of the reed valves 23. In one type of control strategy, the fuel injectors 31 supplied fuel under high speed and high load condition. This assists in cooling of the engine which is not present if only direct cylinder injection is employed. Of course, the invention can be utilized in conjunction with various other types of control strategies, as will be readily apparent to those skilled in the art.

The fuel charge is then ignited at an appropriate time by firing of a spark plug 33 mounted in the cylinder head 26 in registry with each combustion chamber 25. The spark plugs 33 are fired by a suitable ignition circuit which includes a magneto generator 34 driven from one end of the crankshaft 16 in a known manner.

A started motor 35 is positioned at the end of the crankshaft 16 opposite to the magneto generator 34 and drives a starter gear 36 which is meshed with a corresponding starter gear on the crankshaft 16 for its starting. This end of the crankshaft 16 also drives a drive gear 37 which is selectively coupled by means of a clutch 38 to a high pressure fuel pump 39. The fuel pump 39 is driven by the gear 37 when the engine is running and by the starter gear 36 during cranking so that the fuel pump 39 will supply fuel at a higher pressure when starting then where it drive directly from the engine. However, once the engine starts the clutch 38 is engaged and the fuel pump 39 is driven at a fixed speed ratio relative to the engine.

The fuel pump 39 receives fuel from a fuel tank 41 through a supply line 42. A fuel filter 43 is positioned in this supply line and filters the fuel before it is delivered to the pump 39. The pump 39 outputs the pressurized fuel to an accumulator chamber 44 and supply line 45 that leads to a fuel/air manifold 46. In addition, a pressure relief valve 47 is provided in the pump discharge line 45 adjacent the accumulator 44 so as to limit the maximum fuel pressure which can be generated.

Fuel is supplied from the manifold 46 to the injectors 28 and the injectors 31 in a manner which will be described.

There is further provided an air pump 47 which draws atmospheric air through an air filter 48 and which delivers it to the fuel/air manifold 46 through a supply line 49. A two speed drive like that of the fuel pump 39 is provided for the air compressor 47 and this includes a crankshaft driven gear 51 and a clutch 52 that selectively couples the air compressor 47 to either the starter gear 36 or the crankshaft driven gear 51. A higher rotational speed occurs when the engine is being started so as to supply a greater air pressure during this start up operation than would be possible if the air compressor 47 was solely driven from the crankshaft.

The air/fuel manifold 46 has an air line 53 and a fuel line 54 to which the air and fuel, respectively, are supplied through the conduits 49 and 45. A regulator 55 is positioned downstream of the manifold 46 for regulating the fuel/air pressure to maintain a predetermined pressure differential therebetween. This is achieved by by-passing excess fuel back to the fuel tank 41 through an appropriate return conduit and by venting air to the atmosphere.

In addition, a conduit 56 extends from the regulator 55 and supplies fuel to the injectors 31. These injectors 31 operate at a lower pressure than the fuel/air injectors 28 because they do not spray into the combustion chamber. To regulate this lower pressure, there is provided a return line 57 that goes back to the fuel tank 41 and in which a lower pressure regulator 58 is provided.

The fuel/air supply system for the engine 11 as thus far described may be considered to be conventional. For that reason, details of its construction and specifically that of the injectors 28 and 31 is not believed to be necessary to permit those skilled in the art to utilize the invention. The invention deals with the manner and the way in which the amount of fuel is controlled and that will now be described again initially by reference to FIG. 1.

The system is provided with a CPU 59 which receives input signals from various sensors, to be described, an output control signals to various devices to be controlled including the timing and firing of the spark plugs 33 and the initiation and duration of injection and fuel and air into the engine by both the fuel/air injectors 28 and the fuel injectors 33. The input signals from the sensors are indicated by the broken lines in FIG. 1 and the output or control signals are indicated by the solid lines.

The condition sensors include an engine temperature sensor 61 which, in the illustrated embodiment, is a sensor that is mounted in the cylinder head 26 and extends into the cylinder head cooling jacket. In addition, there is an intake air temperature sensor 62 mounted in the air intake device 19 so as to sense ambient air temperature delivered to the engine. There is further provided an engine load sensor in the form of crankcase pressure sensors 63 that are mounted in the crankcase chambers 18 for sensing the air pressure therein. It is well known that the load or air flow to an engine can be accurately sensed in a two cycle engine, at least under many running conditions, by such a pressure sensor. In addition, a second engine load sensor in the form of a throttle position sensor 64 is mounted in one of the manifold runners 21 in proximity to its throttle valve 22 and provides a signal to the CPU 59 indicative of throttle valve position. This also is, as is well known, an indication of engine load.

A crank angle sensor 65 is mounted in combination with the flywheel magneto 34 and provides an output signal indicative of crankshaft angle position. In addition to these sensors, various other sensors may be incorporated so as to sense various conditions of the engine and the ambient condition so as to provide full control. The important feature of the invention, however, is the use of two different sensors for sensing a specific engine condition, in this case engine load, as being sensed by the crankcase pressure sensor 63 and throttle valve position sensor 64. The reason for this will be described latter.

As may be seen from FIG. 1, the CPU 59 outputs various control signals to both the air/fuel injection system 46 to control the fuel injector portions of the air/fuel injectors 28 both as to timing and duration and also the opening and closing time of the main injection valve 29 of these injectors to control the period of duration of injection into the combustion chamber 25 and the timing thereof. In addition, the supplemental fuel injectors 31 are also controlled by the CPU 59 so as to control the time during the engine running when these injectors 31 inject and also the duration and timing of their injection. As previously noted, the strategy primarily is that the auxiliary fuel injectors 31 inject fuel into the induction system when the engine is running primarily under high load conditions so as to provide cooling for the underside of the pistons 14.

The CPU 59 also controls the timing of the firing of the spark plugs 33 as indicated by the arrow in FIG. 1.

The engine 11 may also be provided with an exhaust control valve which controls the timing of the opening of the exhaust port (not shown) so as to improve emission and running and the exhaust control valve output signal is also indicated by an arrow in FIG. 1.

The engine 11 may also be provided with a lubrication system that includes a lubricant pump 66 which is controlled by the CPU 59 to deliver lubricant to the main bearings for the crankshaft 16 and into the scavenge ports 24 for lubrication of the other components of the engine, as is well known in two cycle practice. Any desired control strategy may be provided for controlling the lubricant pump 66 so as to insure adequate lubrication under all running conditions.

The strategy for controlling the amount of fuel injected by both the air/fuel injectors 28 and the fuel injectors 31 will now be described by particular reference to the remaining figures.

Figure 2:
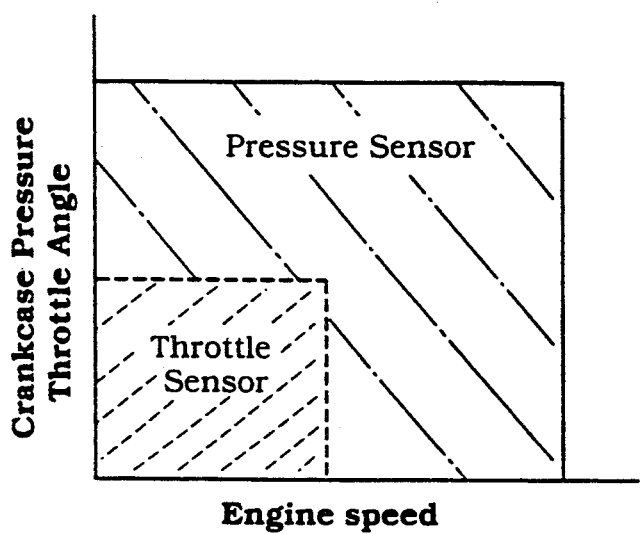
FIG. 2 is a graphical view showing the relationship of crankcase pressure and throttle angle to engine speed and shows the area where the sensors have their greatest sensitivity.

Referring first to FIG. 2, this is a graphical view showing the relationship of engine speed to crankcase pressure and throttle angle and the shaded areas indicate the areas when the throttle position sensors 64 have their greatest sensitivity and also when the crankcase pressure sensors 63 have their greatest sensitivity. The position of the throttle valves 22 is extremely accurate in indicating the load on the engine when running at low speeds and low loads. However, as the speed and load of the engine increases, the accuracy of the load condition provided by the throttle position sensors 64 somewhat deteriorates. On the other hand, the crankcase pressure sensors 63 are not to accurate as to actual variations in load condition under low load and low speed conditions, but are extremely accurate under high speed high load conditions. Of course, the line of demarcation between the sensitivities of the crankcase pressure sensors 63 and throttle position sensors 64 is not a clear one. Partially for this reason, the system employs an arrangement wherein the amount of control provided by each of these sensors is proportioned by the CPU 59 so as to provide extremely accurate fuel control under all conditions.

Figure 3:
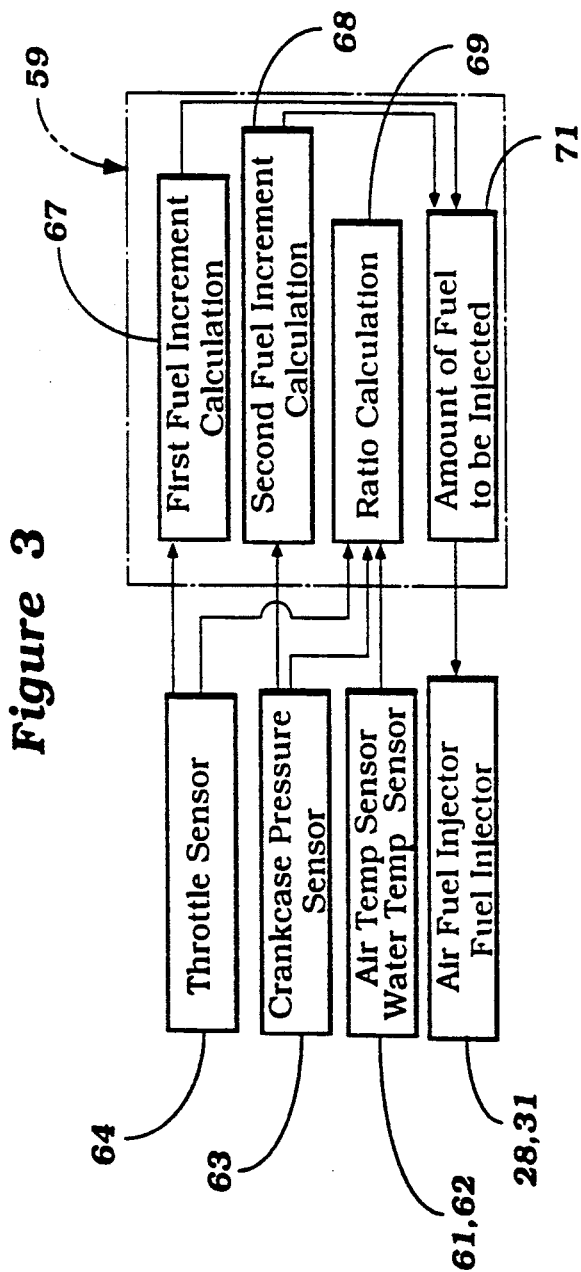
FIG. 3 is a block diagram showing the relationship of the various sensors and control mechanism.

FIG. 3 is a view showing the relationship of the various sensors and units controlled by the sensors to the CPU 59. It will been seen that the throttle position sensors 64 input data to a section of the CPU 59 indicated by the reference numeral 67 which section performs a first fuel increment calculation. This calculation is based upon the amount of fuel required by the engine for a given position of the throttle sensor. In a similar manner, the crankcase pressure sensors 63 output their data to a second fuel increment calculation stage 68 which also provides a fuel increment signal indicative of that determined by the crankcase pressure.

The throttle position sensors 64 and crankcase pressure sensors 63 also output their data to a stage 69 which stage also receives the water temperature and air temperature signals from the sensors 61 and 62 and makes a calculation of the ratio of the signals from the first and second stages, 68 and 69, which are then summed in summing stage 71 which then outputs signals to the fuel/air injectors 28 and fuel injectors 31 to determine when the fuel injectors 31 will discharge and also the amount of fuel discharge by both the air/fuel injectors 28 and the fuel injectors 31.

Figure 6:
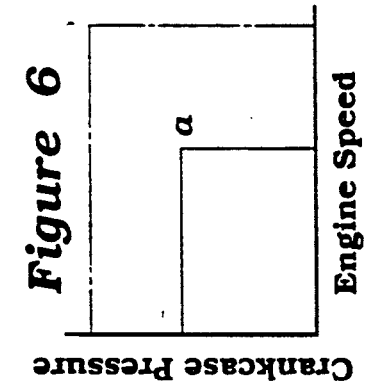
FIG. 6 is a graphical view showing how the amount of the fuel supplied in response to the sensed crankcase pressure is calculated.
Figure 5:
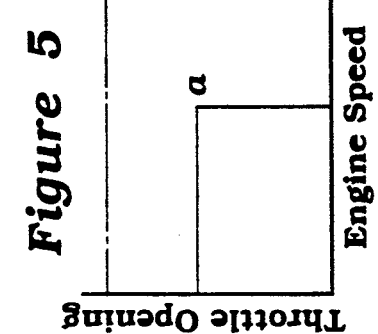
FIG. 5 is a graphical view showing how the increment of fuel supplied in response to the throttle position is calculated.
Figure 4:
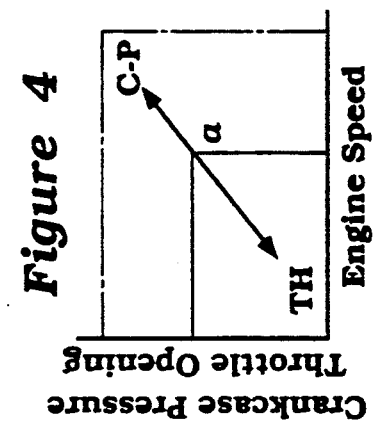
FIG. 4 is a graphical view showing the range of control by the throttle angle sensor and the crankcase pressure sensor.

FIG. 4 is a graphical view showing how the ratios between the two sensor signals are determined. For example, at a given point in the mid speed, mid load range condition shown as the point a, the ratio between the throttle positions sensor and the crankcase pressure sensor is approximately 40 to 60. This ratio is determined by the slope of the curve in FIG. 3. The individual calculations stages 67 and 68 perform calculations in accordance with the maps of FIGS. 5 and 6 so as to determine the first and second fuel increments portions from these respective stages. These proportions are than ratioed in accordance with the ratio determined from FIG. 4 and summed to determine the total amount of fuel injected.

Figure 7:
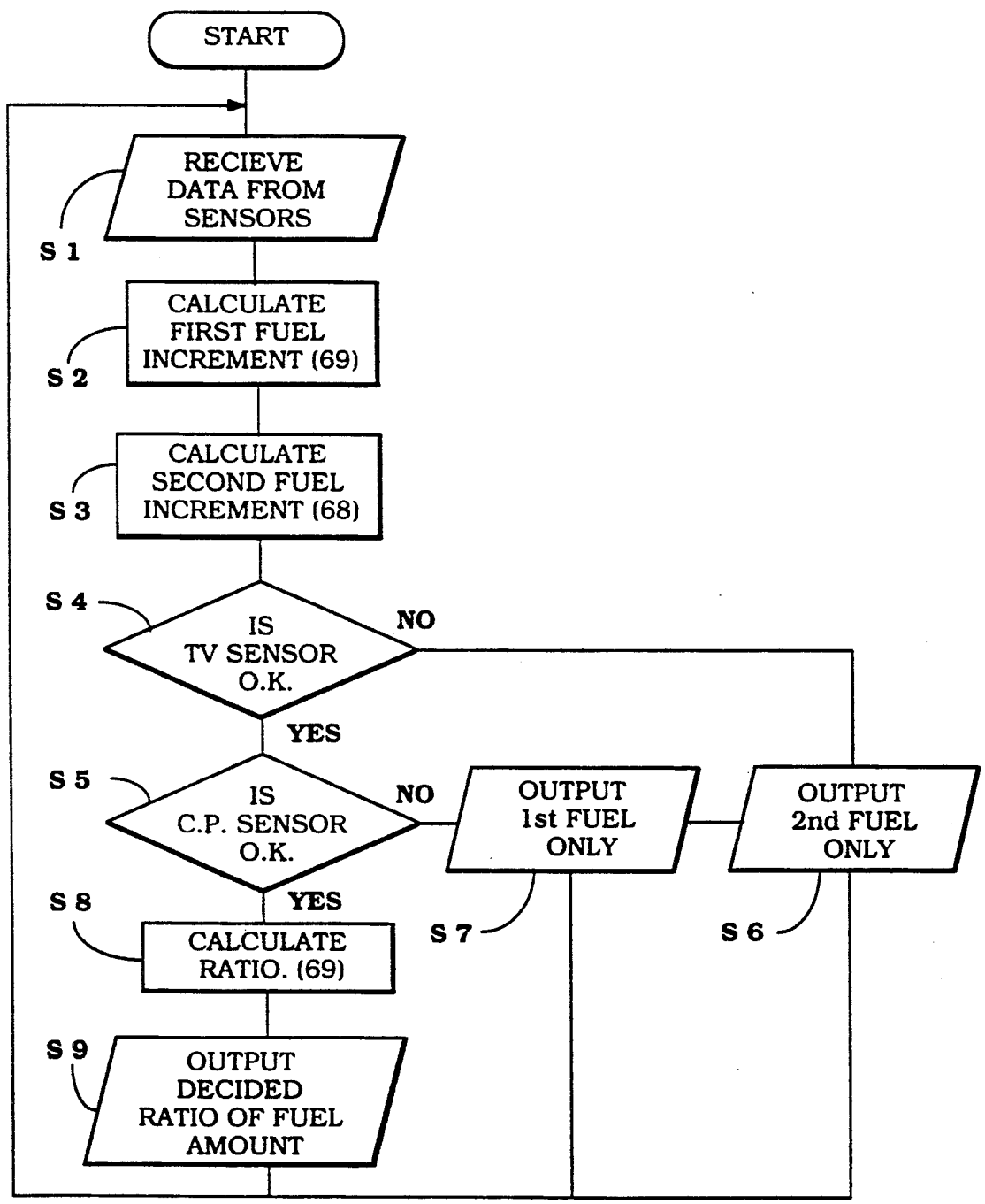
FIG. 7 is a block diagram showing the control routine.

The control routine may be best understood by reference to FIG. 7. Once the program starts, it moves to the step S1 to receive the various data from the sensors. Then at the step S2, the first fuel increment calculation is made by the stage 67 from the position of the throttle valve sensors 64 in accordance with the map of FIG. 5. The program then moves to the step S3 wherein the second fuel increment calculation is made by the CPU section 68 in accordance with the map of FIG. 6 depending upon the crankcase pressure sensed.

The program then moves to the step S4 to do a self checking function to see if the throttle valve sensor 64 is operating accurately. If it is not, the program then moves to the safety step S6 for a safety routine wherein the output of only the second fuel increment stage determined by the output of the crankcase pressure sensor is supplied to the fuel injection system. This is done to insure good control since it has been determined that the throttle valve sensor is not providing an accurate signal.

If, however, at the step S4 it is determined that the throttle valve sensor 64 is outputting an accurate signal, then the program moves to the step S5 to self check and determine that the crankcase pressure sensors 63 are outputting proper signals. If at the step S5 it is determined that the crankcase pressure sensor is defective, then the program moves to the safety step S7 so as to output data only from the first fuel increment calculation for controlling the fuel injectors since this signal is the only reliable one.

If, it is determined at the step S4 and S5 that both sensors are outputting accurate date, then the program moves to the step S8 wherein the CPU section 69 provides the ratio calculation in accordance with the map of FIG. 4. The program then moves to the step S9 so as to output the calculated ratio of signals to the fuel/air injectors 28 and the fuel injector 31 if the engine is operating in the range where that injector also should be operated.

It should be readily apparent from the foregoing description that the described fuel control system for the fuel injectors is effective to provide extremely accurate fuel control by using two sensors which have different ranges of optimum sensitivity and by proportioning the ratio of the signals from these sensors depending upon predetermined maps. Of course, the foregoing description is that of a preferred embodiment of the invention and various changes and modifications may be made without departing from the spirit and scope of the invention, as defined by the appended claims.

We claim:

1. A fuel control system for an internal combustion engine operating over a range of speed and load conditions, a first sensor for sensing a certain engine condition, a second sensor for sensing a certain engine condition, said first sensor being more accurate in certain portions of the engine range than said second sensor is in that range portion, and control means for receiving input signals from said first and said second sensors for controlling the amount of fuel delivered to said engine, said control means being more responsive to the input signal from said first sensor when operating in the certain range portion.

2. A fuel control system as set forth in claim 1 wherein the second sensor is more accurate in a second certain portion of the engine range than the first sensor and wherein the control means is more responsive to the input from said second sensor in said second range portion.

3. A fuel control system as set forth in claim 1 wherein the control means is responsive under all conditions to the signals from both of the sensors.

4. A fuel control system as set forth in claim 3 wherein the second sensor is more accurate in a second certain portion of the engine range than the first sensor and wherein the control means is more responsive to the input from said second sensor in said second range portion.

5. A fuel control system as set forth in claim 4 wherein both of the sensors sense the same engine condition.

6. A fuel control system as set forth in claim 5 wherein the sensed engine condition is load.

7. A fuel control system as set forth in claim 6 wherein the first sensor senses load by throttle valve position.

8. A fuel control system as set forth in claim 6 wherein the second sensor senses load by pressure in the induction system of the engine.

9. A fuel control system as set forth in claim 8 wherein the engine operates on a two cycle crankcase compression principal and the sensed pressure is crankcase chamber pressure.

10. A fuel control system as set forth in claim 9 wherein the first sensor senses load by throttle valve position.

11. A fuel control system as set forth in claim 1 wherein both of the sensors sense the same engine condition.

12. A fuel control system as set forth in claim 11 wherein the first sensor senses load by throttle valve position.

13. A fuel control system as set forth in claim 12 wherein the throttle position sensor is more sensitive in the low speed low load condition.

14. A fuel control system as set forth in claim 11 wherein the second sensor senses load by pressure in the induction system of the engine.

15. A fuel control system as set forth in claim 14 wherein the engine operates on a two cycle crankcase compression principal and the sensed pressure is crankcase chamber pressure.

16. A fuel control system as set forth in claim 15 wherein the crankcase pressure sensor is more sensitive in the high load high speed ranges.

17. A fuel control system as set forth in claim 6 wherein the first sensor senses load by throttle valve position.

18. A fuel control system as set forth in claim 17 wherein the throttle position sensor is more sensitive in the low speed low load condition.

19. A fuel control system as set forth in claim 1 wherein the fuel control system is a fuel injection system.

20. A fuel control system as set forth in claim 19 wherein the amount of fuel is controlled by controlling the duration of fuel injection.

21. A fuel control system as set forth in claim 20 wherein the first sensor senses load by throttle valve position.

22. A fuel control system as set forth in claim 21 wherein the throttle position sensor is more sensitive in the low speed low load condition.

23. A fuel control system as set forth in claim 20 wherein the second sensor senses load by pressure in the induction system of the engine.

24. A fuel control system as set forth in claim 23 wherein the engine operates on a two cycle crankcase compression principal and the sensed pressure is crankcase chamber pressure.

25. A fuel control system as set forth in claim 24 wherein the crankcase pressure sensor is more sensitive in the high load high speed ranges.

26. A fuel control system as set forth in claim 25 wherein the first sensor senses load by throttle valve position.

27. A fuel control system as set forth in claim 26 wherein the throttle position sensor is more sensitive in the low speed low load condition.

28. A fuel control system as set forth in claim 1 wherein there is further provided means for checking the operating characteristics of one of the sensors and controlling the fuel solely by the other of the sensors when the one sensor is determined to be malfunctioning.

29. A fuel control system as set forth in claim 28 wherein the operating condition of each of the sensors is checked and control is maintained by the other of the sensors when one of the sensors is deemed to be malfunctioning.

30. A fuel control system as set forth in claim 11 wherein there is further provided means for checking the operating characteristics of one of the sensors and controlling the fuel solely by the other of the sensors when the one sensor is determined to be malfunctioning.

31. A method of fuel control system for an internal combustion engine operating over a range of speed and load conditions, the engine having a first sensor for sensing a certain engine condition, and a second sensor for sensing a certain engine condition, the first sensor being more accurate in certain portions of the engine range than said second sensor is in that range portion, said method comprising the steps of receiving input signals from the first and said second sensors for controlling the amount of fuel delivered to said engine, proportioning the fuel in a rate more responsive to the input signal from the first sensor when operating in the certain range portion.

32. A method of fuel control system as set forth in claim 31 wherein the second sensor is more accurate in a second certain portion of the engine range than the first sensor and wherein the proportioning rate is more responsive to the input from said second sensor in said second range portion.

33. A method of fuel control system as set forth in claim 31 wherein the control is responsive under all conditions to the signals from both of the sensors.

34. A method of fuel control system as set forth in claim 33 wherein the second sensor is more accurate in a second certain portion of the engine range than the first sensor and wherein the fuel proportion is more responsive to the input from the second sensor in the second range portion.

35. A method of fuel control system as set forth in claim 34 wherein both of the sensors sense the same engine condition.

36. A method of fuel control system as set forth in claim 35 wherein the sensed engine condition is load.

37. A method of fuel control system as set forth in claim 36 wherein the first sensor senses load by throttle valve position.

38. A method of fuel control system as set forth in claim 37 wherein the second sensor senses load by pressure in the induction system of the engine.

39. A method of fuel control system as set forth in claim 38 wherein the engine operates on a two cycle crankcase compression principal and the sensed pressure is crankcase chamber pressure.

40. A method of fuel control system as set forth in claim 39 wherein the first sensor senses load by throttle valve position.

41. A method of fuel control system as set forth in claim 31 wherein both of the sensors sense the same engine condition.

42. A method of fuel control system as set forth in claim 41 wherein the first sensor senses load by throttle valve position.

43. A method of fuel control system as set forth in claim 42 wherein the throttle position sensor is more sensitive in the low speed low load condition.

44. A method of fuel control system as set forth in claim 41 wherein the second sensor senses load by pressure in the induction system of the engine.

45. A method of fuel control system as set forth in claim 44 wherein the engine operates on a two cycle crankcase compression principal and the sensed pressure is crankcase chamber pressure.

46. A method of fuel control system as set forth in claim 45 wherein the crankcase pressure sensor is more sensitive in the high load high speed ranges.

47. A method of fuel control system as set forth in claim 46 wherein the first sensor senses load by throttle valve position.

48. A method of fuel control system as set forth in claim 47 wherein the throttle position sensor is more sensitive in the low speed low load condition.

49. A method of fuel control system as set forth in claim 31 wherein the fuel control system is a fuel injection system.

50. A method of fuel control system as set forth in claim 49 wherein the amount of fuel is controlled by controlling the duration of fuel injection.

51. A method of fuel control system as set forth in claim 50 wherein the first sensor senses load by throttle valve position.

52. A method of fuel control system as set forth in claim 51 wherein the throttle position sensor is more sensitive in the low speed low load condition.

53. A method of fuel control system as set forth in claim 50 wherein the second sensor senses load by pressure in the induction system of the engine.

54. A method of fuel control system as set forth in claim 53 wherein the engine operates on a two cycle crankcase compression principal and the sensed pressure is crankcase chamber pressure.

55. A method of fuel control system as set forth in claim 54 wherein the crankcase pressure sensor is more sensitive in the high load high speed ranges.

56. A method of fuel control system as set forth in claim 55 wherein the first sensor senses load by throttle valve position.

57. A method of fuel control system as set forth in claim 56 wherein the throttle position sensor is more sensitive in the low speed low load condition.

58. A method of fuel control system as set forth in claim 31 further including the step of testing the operation of one of the sensors and controlling the fuel only by the other of the sensors when the one sensor is tested to be defective.

59. A method of fuel control system as set forth in claim 58 wherein the operation of each of the sensors is tested and control is by the other of the sensors when one of the sensors is tested as defective.

* * * * *